United States Patent [19]

Lee

[11] 3,713,458
[45] Jan. 30, 1973

[54] HIGH-PRESSURE, EXPLOSIVELY-ACTUATED SPOOL VALVE

[75] Inventor: John T. M. Lee, Phoenixville, Pa.
[73] Assignee: ICI America Inc.
[22] Filed: Oct. 30, 1970
[21] Appl. No.: 85,477

[52] U.S. Cl. ...................137/312, 137/68, 251/63, 251/130
[51] Int. Cl. ...........................F16k 3/26, F16k 31/00
[58] Field of Search............137/67, 68, 70, 71, 312; 251/11, 63, 324, 130

[56] References Cited

UNITED STATES PATENTS 1,721,204  7/1929  Burstall .................................251/62
3,159,378  12/1964  Haag ....................................251/63 X
3,511,183  5/1970  Geffner ..............................137/68 X

FOREIGN PATENTS OR APPLICATIONS 1,060,407  11/1953  France ................................251/324

Primary Examiner—Martin P. Schwadron
Assistant Examiner—Richard Gerard
Attorney—Kenneth E. Mulford and Roger R. Horton

[57] ABSTRACT

An explosively-actuated, normally-opened spool valve. The valve has a duct through the spool or the valve casing which prevents movement of the spool due to leakage of a high-pressure fluid flowing through the valve.

10 Claims, 3 Drawing Figures

INVENTOR
John T. M. Lee
BY
ATTORNEY

INVENTOR
John T. M. Lee
BY [signature]
ATTORNEY

HIGH-PRESSURE, EXPLOSIVELY-ACTUATED SPOOL VALVE

This invention relates to an explosively-actuated, normally-opened, high-pressure spool valve having a duct which prevents the spool from moving due to a build-up of pressure at the end of the spool. The duct, which relieves this pressure, may pass either through the spool or through the casing to the outside of the valve.

It is often necessary to be able to shut off a line containing a fluid under high pressure in an emergency. For example, should a line containing an explosive fuel such as gasoline rupture or catch fire, the line must be shut down immediately.

The valve of this invention can be used to shut off a line containing a fluid under high pressure, yet only the small amount of energy in an electric match is needed to operate it. The valve can be used indefinitely before it is finally closed by firing the match. It can then be easily reset and reused. Provision has also been made to operate the valve manually if necessary.

Figure 1:
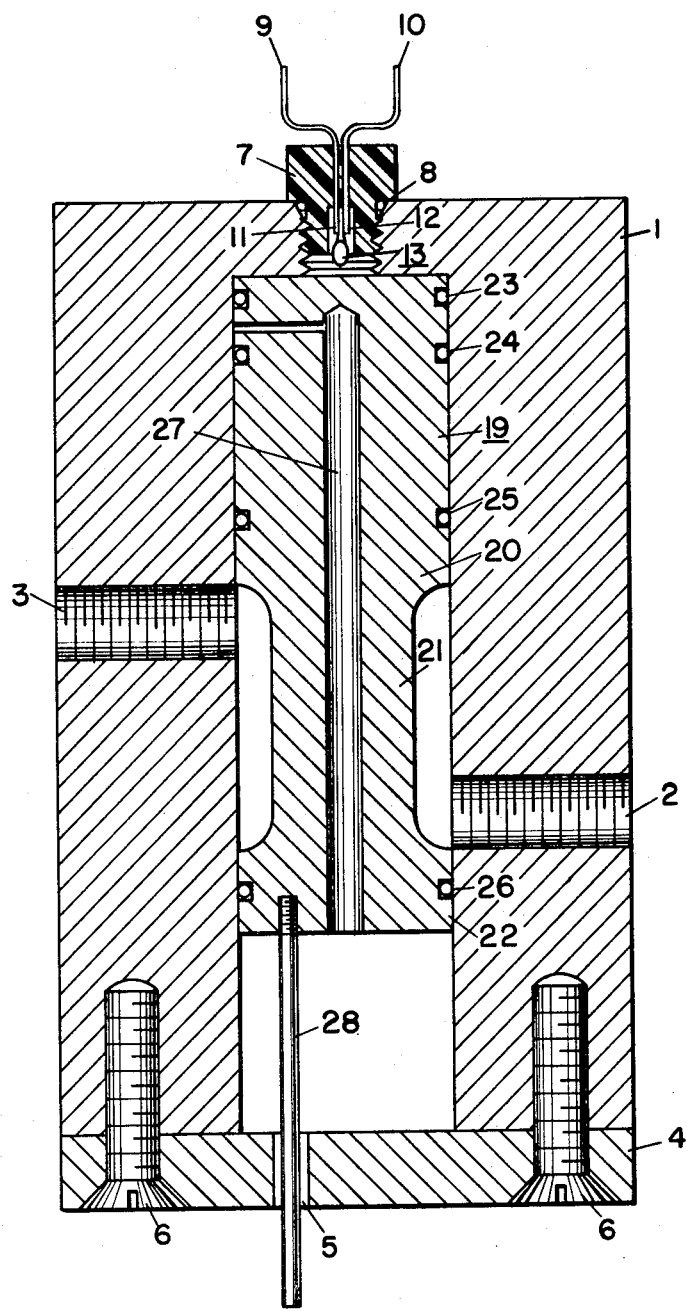
FIG. 1 is a side view in section of an embodiment of the valve of this invention.

In FIG. 1, a casing 1 is provided with two ports 2 and 3 either of which may be the inlet or the outlet port for the a fluid under high pressure. A plate 4 having an exhaust port 5 forms the base of the casing 1 and is held in place by means of screws 6. A plug 7 screws into the top of the casing 1 and is sealed to the casing by means of gasket 8. This plug is preferably of an insulated material such as plastic. Molded into plug 7 are two lead wires 9 and 10 which form contacts 11 and 12, respectively. These contacts hold a match 13 by friction.

Figure 2:
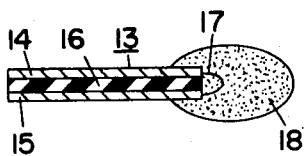
FIG. 2 is a side view in section of the match shown in FIGS. 1 and 3.

Referring now to FIG. 2, match 13 is made up of conductive surfaces 14 and 15 which touch contacts 11 and 12, respectively, in FIG. 1. Surfaces 14 and 15 are separated by insulating layer 16 and are joined by bridgewire 17 which is covered with an explosive composition 18.

Referring again to FIG. 1, contained within casing 1 is a spool 19 having a head portion 20, a narrow neck portion 21, and a shoulder portion 22. The spool 19 is movably sealed to casing 1 by means of O-rings 23, 24, 25, and 26. A duct 27 passes from between O-rings 23 and 24 through the spool and out the shoulder portion 22. A pull rod 28 is attached to the shoulder portion 22 and passes through exhaust port 5.

Should an emergency occur, making it necessary to prevent a fluid from passing between ports 2 and 3 around narrow neck portion 21, a small current is sent through lead wires 9 and 10. This current passes over conductive layers 14 and 15 and heats bridgewire 17 which ignites explosive composition 18. The gas pressure generated by this explosion moves spool 19 until shoulder portion 22 strikes plate 4. In this position, O-ring 25 is between ports 2 and 3 preventing the passage of fluid between them.

Duct 27 is provided to prevent high pressure fluid from passing between spool 19 and casing 1 to the area of match 13 where it could desensitize the match or cause the spool to move down until shoulder portion 22 strikes casing 4. Any fluid under pressure passing between spool 19 and casing 1 will enter duct 27 after it has passed O-ring 24. Fluid passing through duct 27 can be exhausted from the valve through exhaust port 5.

The valve may be closed by hand by pulling rod 28 until shoulder portion 22 strikes casing 4. The valve may be reused by unscrewing plug 7, removing match 13, replacing it with an unused match, repositioning the spool, and screwing plug 7 back into place.

Figure 3:
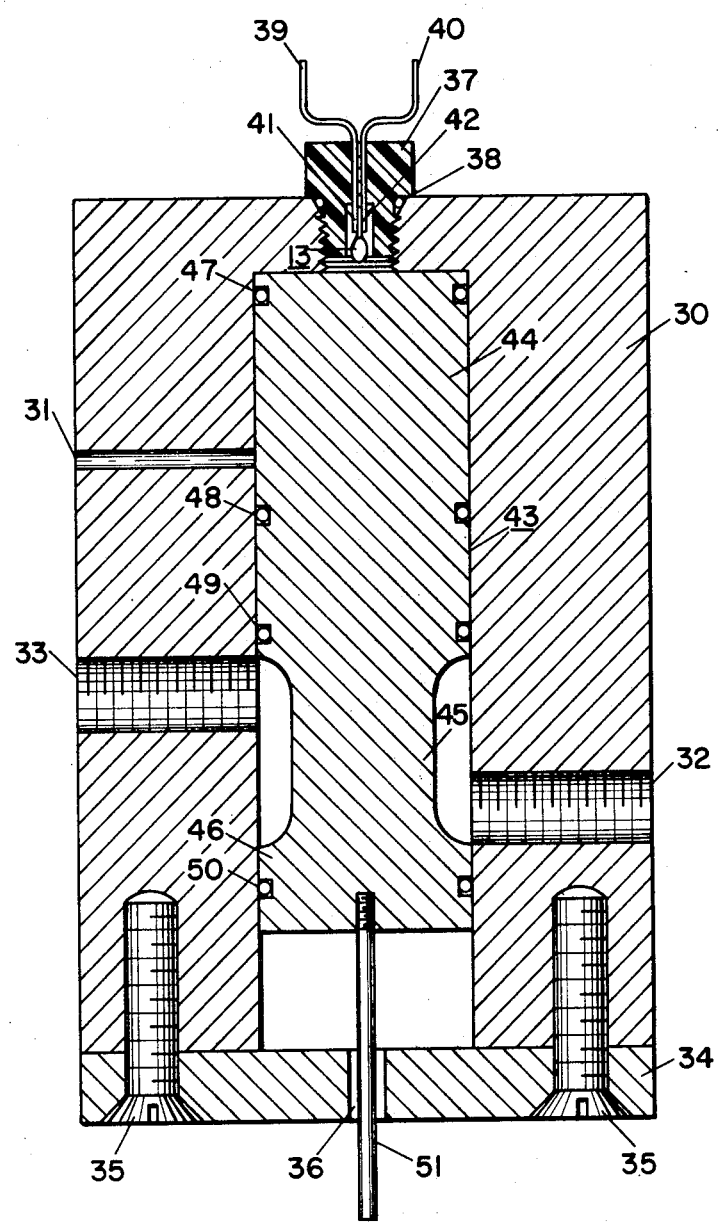
FIG. 3 is a side view in section of a presently preferred embodiment of the valve of this invention. The embodiment of FIG. 3 is preferred as it is of a simpler and less expensive construction.

In FIG. 3, a casing 30 has a relief duct 31 and ports 32 and 33, either of which may be the inlet or the outlet port. A plate 34 is held to the casing by screws 35 and has exhaust port 36 at its center. A plug 37 is screwed into casing 30 and is sealed thereto by gasket 38. Lead wires 39 and 40 are molded into plug 37 and form contacts 41 and 42, respectively. A match 13 as shown in FIG. 2 is held between these contacts. Contained within casing 30 is spool 43 which has a head portion 44, a narrow neck portion 45, and a shoulder portion 46. Spool 43 is slidably sealed to casing 30 by means of O-rings 47, 48, 49, and 50. A pull rod 51 is fixed to shoulder portion 46.

The valve of FIG. 3 operates in the same manner described for the valve of FIG. 1 with the exception that the pressure of fluid passing O-rings 48 and 49 is relieved through duct 31.

O-rings 47 in FIG. 3 and 23 in FIG. 1 are needed to prevent gases produced by the ignition of the electric match from passing through ducts 31 and 27, respectively, which may be hazardous and which would decrease the pressure of the gases. Thus, O-ring 47 remains between duct 31 and the match in FIG. 3 even after the match has fired.

O-rings 48 in FIG. 3 and 24 in FIG. 1 are present to prevent fluid from passing through ducts 31 and 27, respectively, when O-rings 49 and 25, respectively, pass across ports 33 and 3, respectively. However, if ports 32 in FIG. 3 and 2 in FIG. 1 are made the inlet ports, this problem is greatly alleviated and O-rings 48 and 24, respectively, may be eliminated if so desired.

What is claimed is:

1. A normally-opened, explosively-actuated spool valve comprising:
   A. a casing having an inlet port and an outlet port in its sides, one of said ports at least slightly completely below the other;
   B. a spool within said casing having a head portion, a narrow neck portion, and a shoulder portion, said head portion being normally positioned on one side of said ports, said narrow neck portion being of sufficient length to extend across at least a part of both said inlet and outlet ports, said head and shoulder portions being in sealed slidable engagement with said casing, said head portion being in sealed slidable engagement with said casing at at least two junctures, the distance between the two junctures closest to the neck portion being greater than the diameter of the closest port, said spool being slidable within said casing from a position where said juncture closest to the neck portion is above the closest port, to a position where said juncture closest to the neck portion is between said ports;

C. a duct passing from between said head portion and said casing to the outside of said valve, said duct beginning at a point which is above said juncture closest to the neck portion and which is below said juncture farthest from said neck portion at all positions of said spool;

D. an explosive charge positioned in communication with the inside of said casing adjacent the end of said head portion; and E. a pull rod fixed to said shoulder portion of said spool and extending outside said casing.

2. A valve according to claim 1 wherein said duct passes through said casing.

3. A valve according to claim 2 which has a third juncture between said duct and said closest port which juncture remains therebetween at all the positions of said spool.

4. A valve according to claim 1 wherein said duct passes through said spool to the end of said shoulder portion.

5. A valve according to claim 4 which has a third juncture between said duct and said closest port which juncture remains therebetween at all the positions of said spool.

6. A spool valve according to claim 1 wherein said explosive charge is electrically actuated.

7. A spool valve according to claim 6 wherein said explosive charge is an electric match.

8. A spool valve according to claim 7 wherein said electric match is replaceably held in friction engagement by two electrical contacts.

9. A spool valve according to claim 1 wherein said junctures are O-rings.

10. A normally-opened, explosively-actuated spool valve comprising:

A. a casing having an inlet port and an outlet port in its sides, one of said ports at least slightly completely below the other;

B. a spool within said casing having a head portion, a narrow neck portion, and a shoulder portion, said head portion being normally positioned on one side of said ports, said narrow neck portion being of sufficient length to extend across at least a part of both said inlet and outlet ports, said head and shoulder portions being in sealed slidable engagement with said casing, said head portion being in sealed slidable engagement with said casing at at least two junctures, the distance between the two junctures closest to the neck portion being greater than the diameter of the closest port, said spool being slidable within said casing from a position where said juncture closest to the neck portion is above the closest port, to a position where said juncture closest to the neck portion is between said ports;

C. a duct passing from between said head portion and said casing to the outside of said valve, said duct beginning at a point which is above said juncture closest to the neck portion and which is below said juncture farthest from said neck portion at all positions of said spool; and D. an electric match positioned in communication with the inside of said casing adjacent the end of said head portion and replaceably held in friction engagement by two electrical contacts.

* * * * *